Patented May 19, 1936

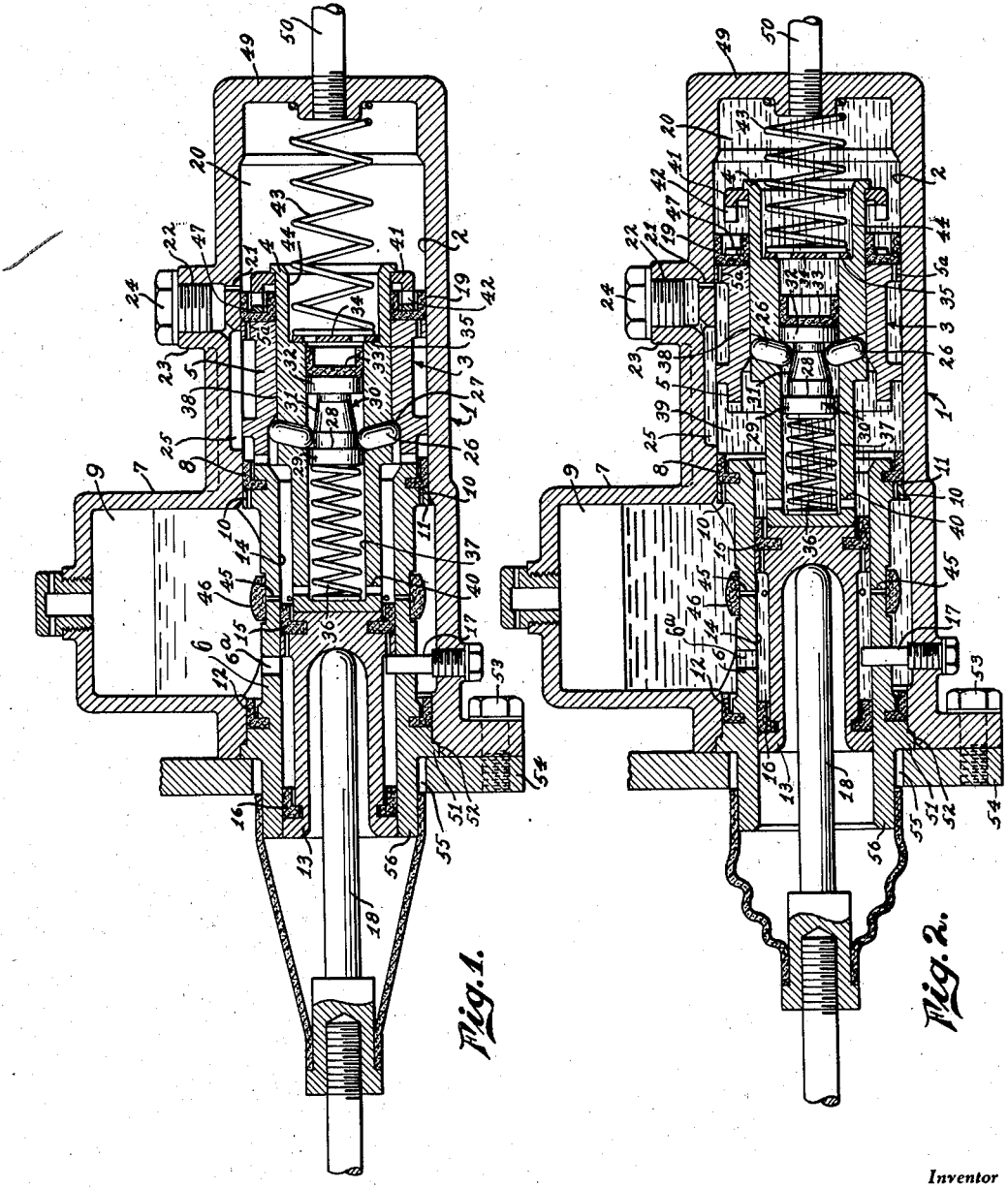

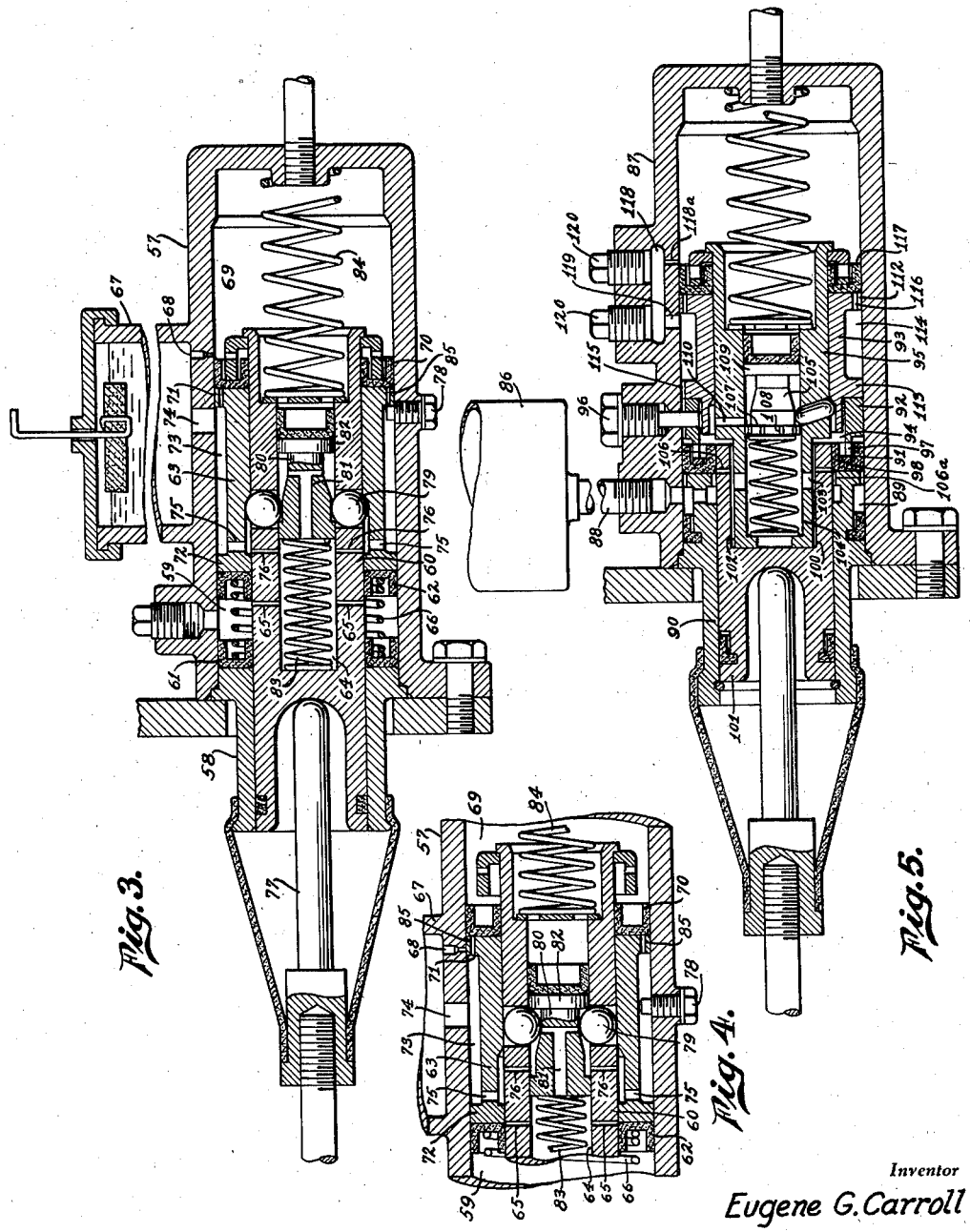

2,041,164

UNITED STATES PATENT OFFICE 2,041,164

MASTER CYLINDER FOR FLUID-OPERATED SYSTEMS

Eugene G. Carroll, Los Angeles, Calif.

Application February 20, 1933, Serial No. 657,485

26 Claims. (Cl. 60—54.6)

This invention relates to a master cylinder for fluid-operated systems, and while this master cylinder may be employed with any operating fluid and in a fluid-operated system for any purpose, it is intended to be used particularly as a master cylinder for hydraulic brake systems.

In fluid systems, for example, a hydraulic system, in which devices are operated by hydraulic pressure, it is desirable to provide means for developing the operating pressure quickly in the system. For this reason, it is desirable to have the diameter of the piston in the master cylinder relatively large, but if the piston is sufficiently large to produce the operating pressure quickly, then it requires a relatively great force to produce the relatively high pressure which is necessary to apply the brakes.

The general object of this invention is to produce a master cylinder having a compound piston operating in such a way that during the first movement of the piston, the entire piston moves forwardly, thereby presenting a relatively large area that causes the development quickly of the operating pressure. After this operating pressure is developed, a part of the piston ceases its advancing movement, and another part of the piston continues to advance to develop a higher operating pressure. One of the objects of this invention is to provide simple means for effecting this mode of operation, and in the preferred embodiment of the invention I employ portions of the fluid to back up the part of the piston whose advance is arrested, so that it will sustain the later and higher pressure, developed, without yielding.

A further object of the invention is to provide a construction for the interior of the cylinder, which will enable the reservoir for the fluid or liquid to be made as an integral part of the wall or shell of the cylinder.

A further object of the invention is to provide a construction, operating in such a way that when the piston advances to develop the pressure, a holding chamber is developed back of the portion of the piston that is stopped in its advance when the operating pressure is developed; also, to provide means for cutting off communication with this chamber so as to trap the liquid or fluid within it, thereby enabling the arrested portion of the piston to sustain the operating pressure developed by the continued advance of the other portion of the piston.

A further object of the invention is to provide a compound piston in which the two sections or parts of the piston are provided with a driving connection which will enable the two sections of the piston to advance in unison, and to provide automatic means controlled by the operating pressure, for releasing this connection to stop the advance of one part of the piston, and permit the further advance of the other part.

Further objects of the invention will appear hereinafter.

The invention consists of the novel parts and combination of parts to be described hereinafter, all of which contribute to produce an efficient master cylinder for fluid-operated systems.

A preferred embodiment of the invention is described in the following specification, while the broad scope of the invention is pointed out in the appended claims.

In the drawings:

Figure 1 is a longitudinal section of a master cylinder embodying my invention, and showing the parts in position of rest.

Figure 2 is a view similar to Figure 1, but showing the compound piston in its operating position, with one of the parts arrested in its advance, and the other part further advanced as in the act of developing the higher pressure.

Figure 3 is a view similar to Figure 1, but illustrating another embodiment of the invention. Figure 3 shows the parts in the position of rest.

Figure 4 is a vertical section showing the parts illustrated in Figure 3, in the vicinity of the driving connection between the two parts of the compound piston, but showing this connection in its released position.

Figure 5 is a view similar to Figure 3, but illustrating another embodiment of the invention.

Referring more particularly to the parts, and especially to Figures 1 and 2, 1 indicates a cylinder in the form of a shell having a bore 2 therein, in which the compound piston 3 slides. This piston may be constructed in any suitable manner, which will enable the entire piston to advance to develop the operating pressure, and which will operate when the operating pressure is developed sufficiently to arrest the advance of part of the piston, and permit the other part to continue its advance. In order to accomplish this, I prefer to construct the compound piston with an inner central piston 4 and an outer annular piston 5 of sleeve-form. These two parts 4 and 5 are relatively movable longitudinally on each other. The outer end of the cylinder 1 is provided with a tubular guide or sleeve 6, which constitutes a long bushing within the cylinder extending past a reservoir 7 for the fluid, which may be cast integral with the cylinder 1. Beyond the reservoir 7 and preferably at the inner end of the sleeve 6, packing means is provided preferably in the form of a cup leather 8, the rear side of which is exposed to the liquid or fluid in the chamber 9 of the reservoir. This may be accomplished by providing passages or ports 10 in a collar 11 at the inner end of the sleeve 6. Near its outer end the sleeve 6 is provided with suitable packing such as a cup leather 12, that packs the fluid in the reservoir and within the cylinder against leaking through the mouth of the cylinder. Back of the inner piston 4, I provide a pusher plunger 13 which is guided to slide in the bore 14 of the sleeve 6, and provided with packing at its front and rear ends, preferably in the form of cup leathers 15 and 16. The outward movement of this pusher plunger in the guide 6 may be limited by a stop 17 in the form of a bolt screwed into the under wall of the cylinder 1.

A port 6ª opens communication between the interior of the reservoir 7 and the interior of sleeve 6.

A push rod 18 extends into the pusher plunger 13 from the outer side, and is connected with the brake lever to enable it to be moved forward when pressure is to be developed in the system. The forward end of the annular piston 5 is provided with suitable packing such as a channel-form cup leather 19, and means is provided in the wall of the cylinder for releasing the fluid in the compression chamber 20 of the cylinder, during the retracting movement of the compound piston. For this purpose I provide a port 21 which may be drilled through the opening 22 in the boss 23 which is afterwards closed by a plug 24, and the interior of this boss communicates with a longitudinal passage 25 in the cylinder wall that extends back beyond the rear end of the annular piston 5.

The forward end of the push plunger 13 rests against the rear end of the inner piston 4, so that when the plunger 13 advances, the inner piston 4 advances into the compression chamber 20. A driving connection is formed between the inner piston 4 and the annular piston 5, so that when the inner piston 4 is advanced, the annular piston 5 advances with it. When the cup leather 19 passes the port 21, compression begins in the chamber 20, and operating pressure is developed that will release the driving connection. This will leave the annular piston 5 in an advanced position as indicated in Figure 2, but will permit the inner piston 4 to continue its advance. In order to accomplish this, I prefer to provide the wall of the inner piston 4 with one or more dogs 26, which may be in the form of elongated studs with rounded noses, and disposed in an inclined position so that the outer ends of these dogs engage against a conical shoulder 27 formed as a counterbore at the outer end of the annular piston 5. When the advancing movement begins, these dogs 26 are held in this position, because they thrust against a shoulder 28, which is the forward side or face of a collar 29 formed at the rear end of a releasing plunger 30, said plunger having a reduced waist 31 that connects it with a forward head 32. This head 32 may be provided with a soft packing cup 33 on its forward end, which is exposed to the pressure in the chamber 20. The waist 31 of the releasing plunger 30, is preferably tapered, having its larger diameter adjacent the head 29. A perforated washer 34 seating in a counter-bore 35, admits the fluid to the end of the releasing plunger 30. The releasing plunger is normally held in an extreme position toward the right, as indicated in Figure 1, by a coil spring 36 disposed in the bore 37 formed in the inner piston 4. When the compound piston advances, this releasing plunger 30 advances with it and holds the dogs 26 in engagement with the shoulder 28, so as to cause the annular piston to advance with the inner piston. As soon as sufficient operating pressure has been developed in the chamber 20, this pressure acting upon the exposed face of the plunger at the cup leather 33, will cause the releasing plunger to move relatively toward the left in the inner piston 4, thereby bringing the reduced waist 31 of the releasing plunger opposite the dogs. This will permit the dogs to slide inwardly into the relation indicated in Figure 2, and in this position their outer ends will be withdrawn to permit the dogs to pass forwardly in the bore 38 of the annular piston 5. When the outer piston 5 advances, it forms an enlarged holding chamber 39 at its rear end just in advance of the cup leather 8, tending to produce a partial vacuum at this point, and thereby drawing in fluid through the ports 10 from the reservoir. In this way, the holding chamber 39 fills itself with fluid or liquid as the compound piston advances. This chamber 39 is packed by the cup leather 15.

The liquid in the holding chamber 39 is also admitted into the bore 37 of the inner piston through suitable passages 40. When the releasing plunger 30 moves relatively to the left, its movement in this direction is eventually stopped by the collar or inner head 32 of the releasing plunger which strikes against the inner ends of the dogs (see Fig. 2). The inner end of the inner plunger carries a collar 41, which has a plurality of tongues 42 that seat against the cup leather 22 of the annular piston, to effect the return of the annular piston to its position of rest.

The inner piston is returned to its position of rest, preferably by a coil spring 43 set in the chamber 20, with one end received in a counterbore 44 in the inner end of the inner piston and seating against the washer 34.

Means is provided for permitting return flow of fluid back into the reservoir 7, and this means preferably consists of a plurality of ports 45 formed in the wall of the sleeve 6, and leading into the bore 14 of the sleeve. In the position of rest, the cup leather 15 is just back of these ports or passages 45, and I attain a check valve effect by placing a collar 46 of soft material, preferably rubber, which envelopes the sleeve at this point and covers the ports 45. With this arrangement it will be evident that the collar 46 acts as a check valve for all the ports 45, but will permit the fluid or liquid in the chamber 39 to flow outwardly through the ports 45 into the reservoir.

The cup leather 22 at the inner end of the annular piston 5, is provided with a follower ring 47, against which the tongues 42 seat when the collar 41 is seated by the return movement of the inner piston 4. The collar 41 may be slipped over the inner piston 4 from its outer end, and seats against a shoulder 48 on the inner end of this inner piston.

The inner end of the annular piston 5 is formed into an enlarged collar with ports 5ª through it near the outer edge of cup leather 19, to permit flow past the cup leather from its back.

The inner head 49 is provided with an outlet pipe 50 which leads to the fluid-operated devices included in the system.

Near the outer end of the bushing 6, it is provided with a collar 51 that seats in a counterbore 52 in the mouth of the bore of the cylinder 1. The outer end of the cylinder is secured in any manner, for example, by bolts 53, to a plate 54 having a central opening 55, through which a neck 56 on the outer end of the bushing or sleeve 6 projects. This opening is of smaller diameter than the collar 51, so as to retain the sleeve in place. This plate 54 may be a bracket forming a part of the frame of the automobile, or attached to a fixed part of the frame.

In the embodiment of the invention illustrated in Figure 3, a shorter master cylinder is employed, and in that construction the sleeve 6 does not extend across the lower end of the reservoir. The construction illustrated in Figure 3, will now be described more in detail. Referring to this figure, the cylinder 57 is closed at its outer end by a short bushing 58, that corresponds to the sleeve 6, and just forward of this bushing I form a holding chamber 59, which is of annular form and located between the inner piston 60 and the wall of the cylinder 57. This holding chamber is packed off at the bushing 58 by a suitable packing such as a cup leather 61, and at its forward end by suitable packing such as a cup leather 62 that seats against the rear face of the annular piston 63. The inner piston 60 is formed with a central bore 64, which communicates with this chamber 59 through a suitable port or ports 65 that pass radially through the wall of the inner piston. A coil spring 66 is provided in the holding chamber that thrusts at its ends, against the cup leathers 61 and 62.

The position of the reservoir 67 in this construction, corresponds to the position of the port 21 of the Figure 1 construction, that is to say, it is disposed nearer to the inner end of the cylinder 57, and is provided with a port 68 that communicates with the pressure chamber 69 just in front of the cup leather 70 at the forward end of the annular piston 63. The annular piston has an enlarged collar 71 at its forward end, and an enlarged collar 72 at its rear end, the diameter of this piston being reduced between these collars so as to form an annular space or passage 73 that is always in communication with the interior of the reservoir through a port or passage 74 in the wall of the cylinder 57. Near the rear end of the annular piston 63, and forward of the rear collar 72, a passage 75 is provided, which maintains communication with the bore 64, either through radial ports 76 in the wall of the piston 60, or through the port 65 already referred to.

In the Figure 3 construction, I also dispense with the pusher plunger 13, which is employed in the Figure 1 construction, and I extend the rear end of the piston 60 to the exterior to engage directly with a push rod 77. The outward movement of the piston 63 is limited by a stop in the form of a screw 78 that is mounted in the wall of the cylinder 57 at its under side, so as to engage the outer side of the collar 71.

In other respects, the construction illustrated in Figure 3 is substantially similar to that described in connection with Figure 1, except that the driving connection between the inner piston 60 and the outer piston 63, employs hardened balls 79, instead of elongated dogs such as the dogs 26 in Figure 1. These balls, however, perform their function in the same way as the dogs 26, and are less expensive because they can be bought readily in the market. The releasing plunger 80 is constructed substantially the same as in the Figure 1 construction, except that it is provided with a passage 81 that opens communication between the rear end of the bore 64 and the forward portion of this bore back of the forward head 82 of this releasing plunger. The releasing plunger is normally held in its extreme forward position by a coil spring 83 in the outer end of the bore 64, and within the compression chamber 69 I provide a coil spring 84 that corresponds to the coil spring 43 of the Figure 1 construction, and functions in the same way.

In Figure 4 I illustrate the releasing plunger in its releasing position, and with the annular piston 63 arrested in its forward movement, and with the inner piston extended further into the compression chamber 69 to develop a higher operating pressure than the pressure which will cause the releasing plunger 80 to disconnect the drive connection through the balls 79. Figure 4 illustrates how the forward ports 76 cooperate with the other ports for maintaining communication from the tank to the bore 64. These ports 76 also operate as outlets to permit the escape of fluid or liquid back of the rear end of the releasing plunger 80 when it is forced back by the development of sufficient operating pressure in the compression chamber 69. These ports permit the fluid or liquid to pass up into the tank or reservoir 67.

At the forward head or collar 71 of the annular piston 63, ports or passages 85 are provided back of the cup leather 70, which perform their functions like the corresponding ports 10 in the Figure 1 construction.

In the embodiment of the invention illustrated in Figure 5, the cylinder can be made even shorter than in Figure 3, as the tank or reservoir 86 is not formed as a part of the cylinder 87, but is connected through a pipe or tube 88, with annular chambers 89 formed around the outer and inner sides of the bushing 90. In other words, in this type of construction, the bushing is comparatively short, but projects across the connection to the tank or reservoir. Against the forward end of the bushing 90, suitable packing such as a cup leather 91 is provided, and just forward of this cup leather, a fixed ring 92 is mounted in the cylinder, which operates as a back stop for the rear end of the annular piston 93. The space between the cup leather 91 and the rear end of the annular piston 93, constitutes a holding chamber 94 that enlarges in volume as the annular piston 93 advances with the inner piston 95. The stop ring 92 is held fixed in position by a removable screw plug 96, and this ring may be provided with tongues 97 that extend back and hold the cup leather 91 against the end of the bushing. If desired, a follower ring 98 may be provided between the tongues 97 and the cup leather.

In the construction shown in Figure 5, the rear end of the inner piston 95 is of reduced diameter and makes a "sloppy" fit in a bore 100 at the inner end of a pusher plunger 101 that slides freely in the bushing 90. This loose fit between the rear end of the inner piston 95 and the bore 100, forms a narrow, annular passage 102 all around the rear end of the piston 95, and this space communicates by ports 103 with the bore 104 in the inner piston 95, in which the releasing plunger 105 operates.

Through the annular wall of the pusher plunger 101, and to the rear of the cup leather 91 in the position of rest of this plunger, radial ports 106 are provided, which are always in communication with the ports 103. In the position of rest, these ports 106 are located to the rear of the cup leather 91, and then communicate through ports 106ª with the annular chambers 89, and thence with the reservoir. The releasing plunger 105 has an enlarged rear head 107 which may be provided with notches 108 in its edge, to maintain communication between the left end of the bore 103 and the space to the rear of the inner head 109 of the releasing plunger.

Just forward of this head 108 in the position of rest of the parts, a radial port 110 is provided in the wall of the inner piston 95, which, in the position of rest, maintains communication with the holding chamber 94, and also with the forward end of the bore 104 back of the forward head 109.

The annular piston 93 has a forward head 112 and a rear head 113, while the diameter of the piston between these heads is reduced to form an annular space 114, which is always full of the operating fluid, and which is maintained in communication with the holding chamber 94 by a suitable passage or passages such as a port 115 formed in the edge of the rear head 113 on the upper side of this piston.

Ports 116 are provided in the forward head 112, that correspond in function to the ports 5ª of the Figure 1 construction. These ports 116 are back of the forward cup leather 117, and permit quick return movement of the annular piston 93 when the application of the force to the pusher plunger 101 ceases.

The space 114 communicates with a small chamber 118 on the upper side of the cylinder, through a port 119. A port 118ª is provided from chamber 118 just in front of cup leather 117 in its position of rest. These ports are drilled through the cylinder wall at openings, which are afterwards closed by screw plugs 120.

I shall now describe briefly, the mode of operation of the master cylinder. In the construction illustrated in Figure 1, when force is applied to the push rod 18, the pusher plunger 13 forces the inner piston 4 forwardly. As this movement takes place, the dogs 26 cause the annular piston 5 to advance with the inner piston 4. As this compound piston advances, the holding chamber 39 enlarges in volume, and as this takes place, fluid is readily admitted through the ports 10, to maintain this holding chamber full of the fluid or liquid.

As the pistons 4 and 5 move forwardly, and as soon as the cup leather 19 has passed the port 21, the operating pressure is developed. This operating pressure builds up and exerts itself against the forward end of the releasing plunger 30, and eventually causes this plunger to shift relatively rearwardly with respect to the direction of advance of the compound piston. This will bring the waist 31 of the releasing plunger opposite the dogs 26 (compressing spring 36) and permitting the dogs to shift inwardly, as indicated in Figure 2. This releases the inner piston from the outer piston and enables it to continue its advance, thereby developing higher operating pressure in the compression chamber 20, which is, of course, a relatively high pressure. The fluid or liquid in the holding chamber 39, fills this chamber and enables the annular piston 5 to maintain the position to which it has been advanced, and enables it to sustain the high pressure developed in the compression chamber 20, without yielding. When the force acting through the push rod 18 ceases, the spring 43 returns the inner piston 4 toward its position of rest. This movement will be permitted by reason of the fact that the pressure in the compression chamber 20, being relieved, the fluid or liquid in the holding chamber 39 will push the annular piston 5 forwardly. In this connection, it should be noted that there is a tendency to develop a slight compression in the trapped liquid in the chamber 39, as the inner piston 4 returns. As soon as the return movement of the inner piston 4 has progressed sufficiently to bring the dogs 26 opposite the shoulder 27, the releasing plunger 30 will be moved relatively inwardly by its return spring 36. The release of the brake pedal permits free rearward movement of the inner annular piston. As it moves rearwardly, the pressure in the chamber 25, Figure 1, becomes released for the reason that the plunger 13 is free to move rearwardly independently of the piston 4. This permits the piston 5 to commence a rearward movement soon after the inner annular piston moves rearwardly, and this movement continues until the port 45 is uncovered. The piston 5 never can arrest the rearward movement of the inner annular piston 4 because the pressure back of the annular piston 5 is not maintained. It can not be maintained because the plunger 13, carrying packing ring 15, is moving rearwardly.

If the brake pedal has the usual return spring, the return spring would withdraw the push rod 18 and thereby remove all resistance to the movement of the piston 13, and this would relieve pressure back of the piston head 32.

The mode of operation as regards the release of the brake pedal would be substantially the same as that just described, for the construction illustrated in Fig. 5. As soon as the cup leather 15 has uncovered the ports 45, liquid or fluid in the contracting holding chamber 39 can pass up through the ports 45 into the chamber 9 of the reservoir; in other words, after the collar 41 engages the annular piston 5, it will return it to its position of rest, and as this occurs, the remaining liquid in the chamber 39 will pass back into the reservoir 7.

In the embodiment of the invention shown in Figure 3, when force is exerted in the push rod 77, the inner piston 60 will move forwardly, and the ball 79 will cause the annular piston 63 to advance with it. As this occurs, the holding chamber 59 will enlarge, being supplied with liquid through the ports 65, the bore 64, and the port 76. When sufficient operating pressure has been developed, the releasing plunger will move relatively toward the rear with respect to the direction of advance of the compound piston, and the parts will assume the relation illustrated in Figure 4, stopping the advance of the annular piston 63, and permitting continued advance of the inner piston 60. At the commencement of the movement of the compound piston forwardly, the operating pressure commences to develop as soon as the cup leather 70 has passed the port 68. The forward movement of the inner piston that occurs after the forward movement of the annular piston 63 has been arrested, will cause the ports 65 to pass under the cup leather 62, thereby sealing off the holding chamber 59, and trapping the liquid therein. This holds the annular piston 63 in its advanced position and enables it to sustain the high pressure developed in the chamber 69 by the further inward movement of the inner piston 60. When the force acting in the push rod 77 ceases, to release the brakes, the return spring 84 commences to return the piston 60 toward its position of rest. The return movement of this inner piston 60 does not tend to diminish the volume in the holding chamber 59, and therefore is not resisted in any way by the trapped liquid in this chamber. As soon as the ports 65 pass to the left of the cup leather 62, the pressure in the holding chamber 59 is relieved through these ports, the bore 64, the ports 76 and 75, and back into the reservoir through the annular space 73 and the ports 74. When this relief occurs for the holding chamber 59, the annular piston 63 can be moved back by engagement with the collar on the inner end of the inner piston.

In the embodiment of the invention illustrated in Figure 5, when the push plunger 101 is moved forwardly, it carries forward the inner piston 99, which, through the driving connection between it and the annular piston 93, causes the annular piston to advance. As soon as the cup leather 117 has passed the port 118ª, the operating pressure will be developed in the inner end of the cylinder 87. This will cause a relative rearward movement of the releasing plunger 105, when sufficient operating pressure is developed to compress the spring 83 and release the annular piston 93, permitting it to stop while the inner piston 99 continues its advance. As the annular piston advances with the inner piston 95, the enlarged holding chamber 94 will be supplied with operating liquid through the ports 106, which are in communication with the annular space 89 through passages 106ª in the forward end of the bushing 90. This will enable the liquid to flow into this enlarging chamber 94, and back up the annular piston 93, as in the constructions illustrated in Figures 1 and 3. In other words, the liquid in the holding chamber 94 is trapped therein, though it does communicate through the passage 115 with the annular passage 114 and with the small chamber 118 above the ports 119 and 118ª. When the inner piston 93 is returned by its return spring in the inner end of the cylinder 87, the return movement will be freely permitted by the liquid in the holding chamber 94, because this return movement does not tend to compress the liquid in it. When pressure on the brake pedal ceases, the pressure in the compression chamber at the forward end of the cylinder, and the spring, force the piston 95 rearwardly, and as soon as the ports 106 pass the cup leather 91, the pressure in the holding chamber 94 is relieved up into the reservoir 86, and free communication is effected for the release of the liquid back of the annular piston 93, which can be then returned to its normal position by engagement with the outer end of the inner piston.

It is understood that the embodiment of the invention described herein, is only one of the many embodiments this invention may take, and I do not wish to be limited in the practice of the invention, nor in the claims, to the particular embodiment set forth.

I claim:

1. In a master cylinder construction for a fluid-operated system, the combination of a cylinder having a bore, a piston having two sections movable relatively longitudinally of each other and mounted for movement in said bore, means for advancing both sections of the piston to develop quickly the operating pressure in the system, means for arresting the advance of one of the piston sections, and means for admitting a portion of the operating fluid back of the arrested section to maintain it in its advanced position and enable it to sustain the operating pressure developed by the continued forward movement of the other piston section.

2. In a master cylinder construction for a fluid-operated system, the combination of a cylinder having a bore, a piston having two sections movable relatively longitudinally of each other and mounted for movement in said bore, means for advancing both sections of the piston to develop quickly the operating pressure in the system, means controlled by the said operating pressure for arresting the advance of one of the piston sections, and means for admitting a portion of the operating fluid back of the arrested section to maintain it in its advanced position and enable it to sustain the operating pressure developed by the continued forward movement of the other piston section.

3. In a master cylinder construction for a fluid-operated system, the combination of a cylinder having a bore, a piston having two sections movable relatively longitudinally of each other and mounted for movement in said bore, means for advancing both sections of the piston to develop quickly the operating pressure in the system, and thereby form a fluid chamber back of one of the piston sections, means controlled by the said operating pressure for arresting the advance of the piston section having said chamber back of it, and means for admitting a portion of the operating fluid into said chamber back of the arrested section to maintain it in its advanced position and enable it to sustain the operating pressure developed by the continued forward movement of the other piston section.

4. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, and means for admitting a portion of the operating fluid back of the annular piston to maintain it in its advanced position and enable it to sustain the operating pressure developed by the continued forward movement of the inner piston.

5. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, a pressure controlled plunger exposed to the operating pressure developed in the cylinder in front of the compound piston, actuated by the said operating pressure to release the driving connection and thereby arrest the advance of the annular piston so as to permit the further advance of the inner piston, and means for admitting a portion of the operating fluid to the space back of the annular piston to maintain it in its advanced position and enable it to sustain the operating pressure developed by the continued forward movement of the inner piston.

6. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, said driving connection including a dog mounted in the inner piston for engaging the annular piston, a releasing plunger mounted in the inner piston so as to move forward with the same until the operating pressure is developed in the cylinder in advance of the compound piston, said releasing plunger for releasing the driving connection, having a part exposed to the operating pressure developed in the cylinder, so that the said operating pressure moves the releasing plunger to effect the release of the driving connection and thereby permit the further advance of the inner piston without the annular piston, and means for admitting a portion of the operating fluid back of the annular piston to maintain it in its advanced position and enable it to sustain the operating pressure developed by the continued forward movement of the inner piston.

7. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, a releasing plunger mounted for longitudinal movement in the inner piston, resilient means thrusting between the inner piston and the releasing plunger for urging the releasing plunger in the direction of advance of the compound piston, said releasing plunger having means thereon for releasing the driving connection by a relative rearward movement of the releasing plunger with respect to the inner piston, said releasing plunger also having a head exposed to the operating pressure developed in the cylinder in advance of the compound piston, operating to cause the relative rearward movement of the releasing plunger when sufficient operating pressure is developed, and thereby release the said driving connection and arrest the advance of the annular piston, so as to permit the further independent advance of the inner piston, and means for admitting a portion of the operating fluid back of the annular piston to maintain it in its advanced position and enable it to sustain the operating pressure developed by the continued forward movement of the inner piston.

8. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, a reservoir for the operating fluid, means for admitting a portion of the operating fluid from the reservoir to the space back of the annular piston to maintain it in its advance position and enable it to sustain the operating pressure developed by the continued forward movement of the inner piston.

9. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, a reservoir for the operating fluid, means for admitting a portion of the operating fluid from the reservoir to the space back of the annular piston to maintain it in its advanced position and enable it to sustain the operating pressure developed by the continued forward movement of the inner piston, and means including a fluid passage for effecting a return of fluid to the reservoir when the compound piston moves back to its position of rest.

10. In a master cylinder construction for a fluid-operated system, the combination of a cylinder having a bore and having a reservoir for the operating fluid on the side of the cylinder, a tubular guide mounted in the bore of the cylinder adjacent the reservoir, a compound piston mounted in the cylinder forward of the guide and comprising an inner piston and an outer annular piston, said inner piston and said annular piston being capable of relative longitudinal movement, said tubular guide having a port through the wall thereof for passing fluid back into the reservoir, a pusher plunger mounted in the bore of the tubular guide back of the inner piston and having packing means located back of the said passage in the position of rest of the compound piston, said pusher plunger engaging the inner piston for advancing the same, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, the advance of the annular piston operating to develop an enlarging chamber back of the same as it advances, passage means associated with the tubular guide for permitting flow of operating fluid from the reservoir into said enlarging chamber, thereby maintaining the annular piston in its advance position and enable it to sustain the operating pressure developed by the continued forward movement of the inner piston.

11. In a master cylinder construction for a fluid-operated system, the combination of a cylinder having a bore and having a reservoir for the operating fluid on the side of the cylinder, a tubular guide mounted in the bore of the cylinder adjacent the reservoir, a compound piston mounted in the cylinder forward of the guide and comprising an inner piston and an outer annular piston, said inner piston and said annular piston being capable of relative longitudinal movement, said tubular guide having a port through the wall thereof for passing fluid back into the reservoir, a pusher plunger mounted in the bore of the tubular guide back of the inner piston and having packing means located back of the said passage in the position of rest of the compound piston, said pusher plunger engaging the inner piston for advancing the same, a driving connection between the inner piston and the annular position for advancing the annular piston with the inner piston to develop the operating pressure in the system, means controlled by the said operating pressure for releasing said driving connection to arrest the advance of the annular piston and permit the further advance of the inner piston without the annular piston, the advance of the annular piston operating to develop an enlarging chamber back of the same as it advances, passage means associated with the tubular guide for permitting flow of operating fluid from the reservoir into said enlarging chamber, thereby maintaining the annular piston in its advanced position and enabling it to sustain the operating pressure developed by the continued forward movement of the inner piston, said passage means having means for checking back flow from the enlarging chamber of the reservoir.

12. In a master cylinder construction for a fluid-operated system, the combination of a cylinder having a bore and having a reservoir for the operating fluid on the side of the cylinder, a tubular guide mounted in the bore of the cylinder adjacent the reservoir, a compound piston mounted in the cylinder forward of the guide and comprising an inner piston and an outer annular piston, said inner piston and said annular piston being capable of relative longitudinal movement, said tubular guide having a port through the wall thereof for passing fluid back into the reservoir, a pusher plunger mounted in the bore of the tubular guide back of the inner piston and having packing means located back of the said passage in the position of rest of the compound piston, said pusher plunger engaging the inner piston for advancing the same, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, the advance of the annular piston operating to develop an enlarging chamber back of the same as it advances, passage means associated with the tubular guide for permitting flow of operating fluid from the reservoir into said enlarging chamber, thereby maintaining the annular piston in its advanced position and enabling it to sustain the operating pressure developed by the continued forward movement of the inner piston, said passage means having means for checking back flow from the enlarging chamber to the reservoir, and means associated with said port for checking flow through the same from the reservoir.

13. In a master cylinder construction for a fluid-operated system, the combination of a cylinder having a bore and having a reservoir for the operating fluid on the side of the cylinder, a tubular guide mounted in the bore of the cylinder adjacent the reservoir, a compound piston mounted in the cylinder forward of the guide and comprising an inner piston and an outer annular piston, said inner piston and said annular piston being capable of relative longitudinal movement, said tubular guide having a port through the wall thereof for passing fluid back into the reservoir, a pusher plunger mounted in the bore of the tubular guide back of the inner piston and having packing means located back of the said passage in the position of rest of the compound piston, said pusher plunger engaging the inner piston for advancing the same, a driving connection between the inner piston and the annular piston for advancing the annular piston with the inner piston to develop the operating pressure in the system, means controlled by the said operating pressure for releasing said driving connection to arrest the advance of the annular piston and permit the further advance of the inner piston without the annular piston, the advance of the annular piston operating to develop an enlarging chamber back of the same as it advances, passage means associated with the tubular guide for permitting flow of operating fluid from the reservoir into said enlarging chamber, thereby maintaining the annular piston in its advanced position and enable it to sustain the operating pressure developed by the continued forward movement of the inner piston, means for retracting the inner piston, and means whereby the retracting movement of the inner piston retracts the annular piston.

14. In a master cylinder construction for a fluid-operated system, the combination of a cylinder having a bore, a bushing mounted in the rear end of the bore, a compound piston mounted in the bore of the cylinder including an inner piston guided to slide through the said bushing and an annular piston mounted on the inner piston, said annular piston and said inner piston being capable of relative longitudinal movement, said cylinder having an annular holding chamber for the operating fluid back of the annular piston, means including passages for the operating fluid for supplying the operating fluid to the said holding chamber, means for advancing the inner piston, a driving connection between the inner piston and the annular piston for advancing the annular piston with the inner piston to develop the operating pressure in the system, means controlled by the operating pressure developed in the cylinder in advance of the compound piston for releasing said driving connection, thereby arresting the advance of the annular piston and enabling the operating fluid in the holding chamber to maintain the annular piston in its advanced position and enabling the annular piston to sustain the operating pressure developed by the further advance of the inner piston.

15. In a master cylinder construction for a fluid-operated system, the combination of a cylinder having a bore, a bushing mounted in the rear end of the bore, a compound piston mounted in the bore of the cylinder including an inner piston guided to slide through the said bushing and an annular piston mounted on the inner piston, said annular piston and said inner piston being capable of relative longitudinal movement, said cylinder having an annular holding chamber for the operating fluid back of the annular piston, said inner piston having a bore therein with a port through the wall thereof communicating with the holding chamber for supplying operating fluid thereto in the position of rest of the compound piston, means for advancing the inner piston, a driving connection between the inner piston and the annular piston for advancing the annular piston with the inner piston to develop the operating pressure in the system, a releasing plunger mounted in the bore of the inner piston for releasing the driving connection and having a head exposed to the pressure developed in the cylinder in advance of the compound piston for causing a relative rearward movement of the releasing plunger when sufficient operating pressure is developed, to release the driving connection, thereby arresting the advance of the annular piston so that when the inner piston advances, said port passes out of communication with said holding chamber, trapping a portion of the operating fluid therein, enabling the same to maintain the annular piston in its advanced position and sustain the operating pressure developed by the further advance of the inner piston.

16. In a master cylinder construction for a fluid-operated system, the combination of a cylinder having a bore, a bushing mounted in the rear end of the bore, a compound piston mounted in the bore of the cylinder including an inner piston guided to slide through the said bushing and an annular piston mounted on the inner piston, said annular piston and said inner piston being capable of relative longitudinal movement, said cylinder having an annular holding chamber for the operating fluid back of the annular piston, said inner piston having a bore therein with a port through the wall thereof communicating with the holding chamber for supplying operating fluid thereto in the position of rest of the compound piston, means for advancing the inner piston, a driving connection between the inner piston and the annular piston for advancing the annular piston with the inner piston to develop the operating pressure in the system, a releasing plunger mounted in the bore of the inner piston for releasing the driving connection and having a head exposed to the pressure developed in the cylinder in advance of the compound piston for causing a relative rearward movement of the releasing plunger when sufficient operating pressure is developed, to release the driving connection, thereby arresting the advance of the annular piston so that when the inner piston advances, said port passes out of communication with said holding chamber, trapping a portion of the operating fluid therein, enabling the same to maintain the annular piston in its advanced position and sustain the operating pressure developed by the further advance of the inner piston, said releasing plunger having a head toward its rear end to cooperate with the driving connection and having a reduced waist connecting the same with its forward head, said releasing plunger having a passage therein opening communication from the rear end of the bore of the inner piston to the space surrounding said waist.

17. In a master cylinder construction for a fluid-operated system, the combination of a cylinder having a bore, a bushing mounted in the rear end of the bore, a compound piston mounted in the bore of the cylinder including an inner piston guided to slide through the said bushing and an annular piston mounted on the inner piston, said annular piston and said inner piston being capable of relative longitudinal movement, said cylinder having an annular holding chamber for the operating fluid back of the annular piston, means including passages for the operating fluid for supplying the operating fluid to the said holding chamber, means for advancing the inner piston, a driving connection between the inner piston and the annular piston for advancing the annular piston with the inner piston to develop the operating pressure in the system, means controlled by the operating pressure developed in the cylinder in advance of the compound piston for releasing said driving connection, thereby arresting the advance of the annular piston and enabling the operating fluid in the holding chamber to maintain the annular piston in its advanced position and enabling the annular piston to sustain the operating pressure developed by the further advance of the inner piston, said cylinder having a reservoir on the upper wall thereof for the operating fluid, the wall of the cylinder, the wall of the annular piston, and the wall of the inner piston having passages therethrough for opening communication from the reservoir to the interior of the inner piston when the compound piston is in its position of rest, and the wall of the cylinder having a forward port therethrough opening communication into the bore of the cylinder in advance of the annular piston when the compound piston is in its position of rest.

18. In a master cylinder construction for a fluid-operated system, the combination of a cylinder having a bore, a bushing mounted in the rear end of the bore, a compound piston mounted in the bore of the cylinder including an inner piston guided to slide through the said bushing and an annular piston mounted on the inner piston, said annular piston and said inner piston being capable of relative longitudinal movement, packing means on the inner end of the bushing for packing the space between the inner piston and the face of the cylinder bore and cooperating with the rear end of the annular piston to form a holding chamber, means including passages for admitting the operating fluid into said holding chamber in the position of rest of the compound piston, said inner piston having a central bore therein, means including passages for admitting the operating fluid to the said central bore, means for advancing the inner piston, a driving connection between the inner piston and the annular piston for advancing the annular piston with the inner piston to develop the operating pressure in the system, and a releasing plunger mounted in said central bore and exposed at its forward end to the pressure developed in the cylinder in advance of the compound piston for releasing said driving connection, thereby arresting the advance of the annular piston and enabling the operating fluid in the said holding chamber to maintain the annular piston in its advanced position and enabling it to sustain the operating pressure developed by the further advance of the inner piston.

19. In a master cylinder construction for a fluid-operated system, the combination of a cylinder having a bore, a compound piston comprising an inner piston and an outer annular piston, said inner piston and said annular piston being capable of relative longitudinal movement, means for advancing the inner piston, a driving connection between the inner piston and the annular piston including a movable part exposed to pressure within the cylinder, for advancing the annular piston with the inner piston to develop quickly an initial pressure in the system, said movable part operating to be moved by the pressure, thereby releasing said driving connection to arrest the advance of the annular piston and permit the further advance of the inner piston without the annular piston.

20. In a master cylinder for a hydraulic system, the combination of a body having a bore receiving the operating fluid, a piston movable therein to develop operating pressure in the forward end of the cylinder, a plunger guided back of the piston and capable of pushing the piston forward, means connected with a foot-actuated pedal for advancing the plunger and the piston in unison in the first part of the stroke, and for effecting the advance of the plunger alone in the latter part of the stroke, said piston operating when it advances, to form an enlarging holding chamber behind it, a reservoir for the operating liquid, means including a port communicating with said holding chamber through which liquid can pass out of said holding chamber, said parts cooperating so that the advance of the plunger and piston effects the closing of said port, thereby trapping liquid in the holding chamber back of the piston to maintain the same in the position to which it has been advanced while the plunger moves forward alone to raise the pressure in the compression chamber.

21. In a master cylinder for a hydraulic system, the combination of cylinder means, a piston of relatively large diameter and a piston of relatively smaller diameter mounted to advance in the cylinder means to develop pressure in the operating liquid in the compression chamber in advance of the pistons, means for positively advancing both pistons in unison during a portion of their stroke, and for effecting the advance of the small piston alone thereafter, said relatively larger piston operating when it advances, to form an enlarging holding chamber behind it, means for supplying liquid to the enlarging holding chamber as the relatively larger piston advances, means including a port through which liquid from the holding chamber could escape, said parts cooperating when the pistons are moved forwardly in unison, to close said port and trap the liquid in the holding chamber back of the larger piston to maintain the same in the position to which it has been advanced while the small piston moves forward alone to raise the pressure in the compression chamber.

22. In hydraulic apparatus, the combination of two relatively movable pistons guided to move to and fro, a locking dog movably mounted in one of said pistons, and a movably mounted control member having an inclined part for engaging said dog to project the same into engagement with the other piston to lock the pistons together for forward movement in unison.

23. In hydraulic apparatus, the combination of two relatively movable pistons guided to move to and fro, a locking dog movably mounted in one of said pistons, and a movably mounted control member having a tapering neck for engaging the end of said dog to project the same into engagement with the other piston to lock the pistons together for forward movement in unison.

24. In hydraulic apparatus, the combination of an outer piston, an annular piston mounted in the outer piston, a locking dog movably mounted in the inner annular piston capable of being projected outwardly to engage the outer piston to advance the same with the inner annular piston, and an inner controlling piston having a substantially conical waist for engaging the inner end of the dog to project the same outwardly.

25. In hydraulic apparatus, the combination of a cylinder, an outer piston mounted to move in the cylinder, an inner annular piston mounted in the outer piston, a dog mounted in the inner annular piston and capable of projecting outwardly to engage the outer piston to advance the same with the inner annular piston, and an inner piston mounted in the inner annular piston having a tapered portion for engaging the inner end of the dog to control the movements of the same, said inner piston being exposed to the pressure in the forward end of said cylinder and operating to move relatively rearwardly when the pressure reaches a predetermined point, and thereby release the inner annular piston to permit its advance independently of the outer piston.

26. In a master cylinder for a hydraulic system, the combination of a cylinder for receiving the operating fluid, a relatively large piston movable therein and a relatively small piston movable therein to develop operating pressure in the forward end of the cylinder, a plunger back of the relatively smaller piston for advancing both pistons, means connecting the pistons for movement in unison in the first part of the stroke and operating to release the pistons after a part of their stroke has occurred, means connected with a foot-actuated pedal for advancing the plunger, said relatively larger piston operating when it advances, to form an enlarging holding chamber behind it, means for admitting a portion of the operating liquid into said chamber, means including a port through which liquid in the said enlarging chamber can escape, said parts cooperating so that when the plunger advances it effects the closing of said port to trap liquid in the holding chamber back of the relatively larger piston and maintain the larger piston in its advanced position while the smaller piston completes its forward movement.

EUGENE G. CARROLL.